United States Patent [19]

Ozcayir et al.

[11] Patent Number: 5,964,925
[45] Date of Patent: Oct. 12, 1999

[54] SULFONATED POLYIMIDE GAS SEPARATION MEMBRANES

[75] Inventors: Yurdagul F. Ozcayir, Nashua, N.H.; Gertrud Goetz; Benjamin Bikson, both of Brookline, Mass.

[73] Assignee: Praxair Technology, Inc., Danbury, Conn.

[21] Appl. No.: 08/968,943

[22] Filed: Nov. 12, 1997

Related U.S. Application Data

[63] Continuation of application No. 08/730,266, Oct. 15, 1996, abandoned, which is a continuation of application No. 08/497,655, Jun. 30, 1995, Pat. No. 5,618,334.

[51] Int. Cl.[6] ................................................. B01D 53/22
[52] U.S. Cl. ............................ 96/14; 95/45; 210/500.39; 210/500.41
[58] Field of Search .................... 95/45; 96/4, 13, 96/14; 210/500.39, 500.41

[56] References Cited

U.S. PATENT DOCUMENTS

| | | | |
|---|---|---|---|
| 3,899,309 | 8/1975 | Hoehn et al. | 95/54 |
| 4,440,643 | 4/1984 | Makino et al. | 96/13 X |
| 4,461,847 | 7/1984 | Hudecek et al. | 96/4 X |
| 4,574,144 | 3/1986 | Yates et al. | 525/435 |
| 4,705,540 | 11/1987 | Hayes | 96/4 X |
| 4,717,393 | 1/1988 | Hayes | 96/4 X |
| 4,717,394 | 1/1988 | Hayes | 96/4 X |
| 4,838,900 | 6/1989 | Hayes | 96/4 X |
| 4,897,092 | 1/1990 | Burgoyne, Jr. et al. | 96/4 X |
| 5,015,268 | 5/1991 | Ho | 96/14 X |
| 5,042,993 | 8/1991 | Meier et al. | 96/14 X |
| 5,071,448 | 12/1991 | Bikson et al. | 96/14 X |
| 5,074,891 | 12/1991 | Kohn et al. | 96/14 X |
| 5,178,940 | 1/1993 | Matsumoto et al. | 96/14 X |
| 5,198,119 | 3/1993 | Berger et al. | 210/500.39 X |
| 5,232,472 | 8/1993 | Simmons et al. | 96/14 |
| 5,248,319 | 9/1993 | Ekiner et al. | 96/14 X |
| 5,262,056 | 11/1993 | Koros et al. | 210/500.39 X |
| 5,266,100 | 11/1993 | Simmons | 96/14 X |
| 5,286,539 | 2/1994 | Kusuki et al. | 96/13 X |
| 5,322,549 | 6/1994 | Hayes | 96/4 X |
| 5,334,697 | 8/1994 | Simmons | 96/14 X |
| 5,364,454 | 11/1994 | Bikson et al. | 96/13 X |
| 5,401,410 | 3/1995 | Bell et al. | 210/500.39 X |
| 5,409,525 | 4/1995 | Kazama et al. | 96/14 |
| 5,443,728 | 8/1995 | Macheras et al. | 210/500.39 X |
| 5,490,931 | 2/1996 | Chung et al. | 210/500.39 X |
| 5,591,250 | 1/1997 | Stern et al. | 95/51 |
| 5,618,334 | 4/1997 | Ozcayir et al. | 96/14 |
| 5,716,430 | 2/1998 | Simmons | 210/500.39 X |
| 5,725,769 | 3/1998 | Miller et al. | 210/500.39 |

FOREIGN PATENT DOCUMENTS

| | | | |
|---|---|---|---|
| 0179474 | 4/1986 | European Pat. Off. | 96/14 |
| 2050251 | 4/1971 | France . | |
| 57-159505 | 10/1982 | Japan | 96/14 |
| 58-037024 | 3/1983 | Japan | 96/13 |

OTHER PUBLICATIONS

Yu E. Kirsh et al., *Journal of Membrane Science*, 103 (1995), 95–103.

E. Gilbert, *Sulfonation and Related Reactions*, 1977, pp. 1–121.

H. Cerfontain, *Mechanistic Aspects in Aromatic Sulfonation and Desulfonation*, 1968, Ch. 1–4, 6, 7 and 9.

Vasil, eva et al., "Synthesis and Properties of Sulfonated Polypytro Mellitimides", *Polymer Science*, USSR, pp. 160–168, Jun. 26, 1970.

*Primary Examiner*—Robert Spitzer
*Attorney, Agent, or Firm*—Robert J. Follett

[57] ABSTRACT

Gas separation membranes are prepared from sulfonated polyimides exhibiting desirable gas separation characteristics, combined with good film-forming properties and desirable solubility characteristics.

6 Claims, No Drawings

SULFONATED POLYIMIDE GAS SEPARATION MEMBRANES

This application is a continuation of prior U.S. application Ser. No. 08/730,266 filing date Oct. 15, 1996, now abandoned which is a continuation of application Ser. No. 08/497,655 filing date Jun. 30, 1995, now U.S. Pat. No. 5,618,334.

BACKGROUND OF THE INVENTION

1. Field of the Invention

This invention relates to the preparation of sulfonated polyimide polymers and their use as gas and vapor separation membranes.

2. Description of Prior Art

Polyimides with a rigid chain backbone structure, strong chain-chain interactions, and high glass transition temperatures have been reported to exhibit good gas separation and permeation characteristics in gas separation applications. U.S. Pat. Nos. 4,705,540; 4,717,393; 4,717,394; 5,042,993; and 5,074,891 disclose such aromatic polyimide gas separation membranes. Polyimides are generally soluble in aprotic solvents such as N,N-dimethylacetamide and N-methylpyrrolidone. Some polyimides are further soluble in dichloromethane and m-cresol. Their solubility characteristics make polyimides suitable for preparation of asymmetric gas separation membranes but less suitable for preparation of composite gas separation membranes, the latter frequently requiring mild, highly volatile, e.g., low boiling temperature solvents.

A number of modified polyimide polymers have been also disclosed in the art. U.S. Pat. Nos. 4,705,540 and 4,717,394 disclose structurally rigid polyimides having alkyl substituents at all positions ortho to amine functions that form membranes with exceptional gas permeability. U.S. Pat. No. 5,042,993 discloses surface-modified polyimide membranes that exhibit high gas separation factors. The preparation of modified polyimides that contain carboxyl groups is described in U.S. Pat. No. 5,076,816.

The preparation of sulfonated polyimides is reported in U.S. Pat. No. 4,574,144. There was no mention therein of the utility of these materials as separation membranes. The preparation of sulfonated polyimides from sulfonated diamines and pryomellitic dianhydride was further reported by I. V. Vasil'eva et al. in Vysokomol. Soyed., A14, No. 1, 143–149 (1972). The polymers were not soluble in mild solvents such as simple alcohols and were not evaluated for membrane applications. Thus, there remains a need in the field to prepare polyimides with improved separation/permeation characteristics and improved solubility.

It is an object of this invention, therefore, to prepare modified polyimides that have broad solubility characteristics including solubility in mild low-boiling temperature solvent systems, such as alcohols that are most useful in preparation of composite membranes.

It is another object of this invention to prepare modified polyimides with improved gas permeation and separation characteristics.

With these and other objects in mind, the invention is hereinafter described in detail, the novel features thereof being particularly pointed out in the appended claims.

SUMMARY OF THE INVENTION

Sulfonated polyimide polymers of this invention exhibit improved solubility characteristics, are good film-forming materials and exhibit improved gas separation characteristics. Such sulfonated polyimides are particularly useful for preparation of asymmetric and composite gas separation membranes.

DETAILED DESCRIPTION OF THE INVENTION

The invention relates to the preparation of gas separation membranes from sulfonated polyimides of the following general formula:

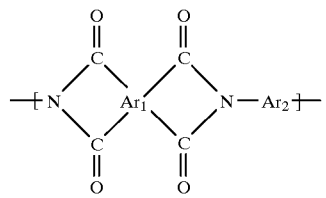

$Ar_1$ and $Ar_2$ are organic radicals, with at least about 80%, preferably at least about 90%, of said $Ar_1$ and $Ar_2$ radicals comprising aromatic radicals, including embodiments in which said $Ar_1$ and $Ar_2$ radicals are essentially completely aromatic radicals, and with at least a portion, desirably at least 5 percent, of aromatic rings in the polyimide backbone containing sulfonic acid radicals. An aromatic radical will be understood to comprise an organic radical containing at least one aromatic ring. The sulfonic acid radical is defined as sulfonic acid group, —$SO_3H$, salified sulfonic acid group, —$SO_3M$, or sulfonic acid ester group —$SO_2OR^1$. M is an organic base, ammonium ion, alkali ion such as $K^+$, $Na^+$ or $Li^+$, preferably $Li^+$, alkaline earth or transitional metal ion. $R^1$ is an alkyl radical with less than 6 carbon atoms or an aryl radical, preferably methyl or ethyl. Most frequently, sulfonic acid radicals are attached to difunctional amino radical $Ar_2$. In the preferred embodiments, $Ar_1$ is an aromatic dianhydride radical represented by the following structures:

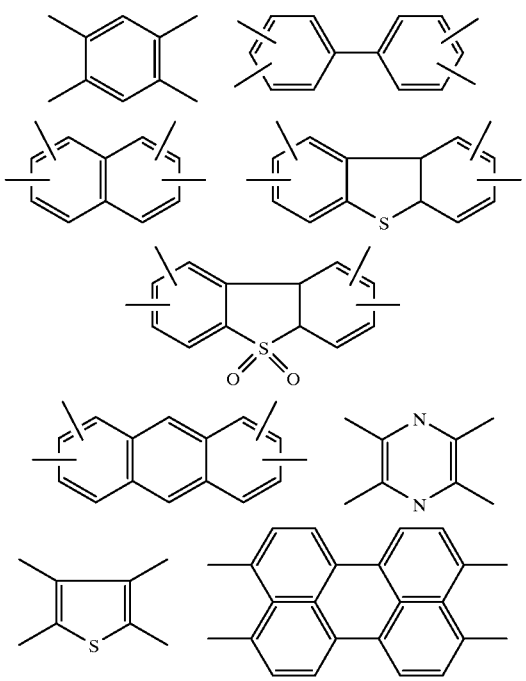

-continued

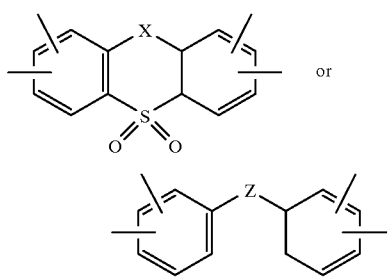

where X is —CH$_2$—,

and Z is

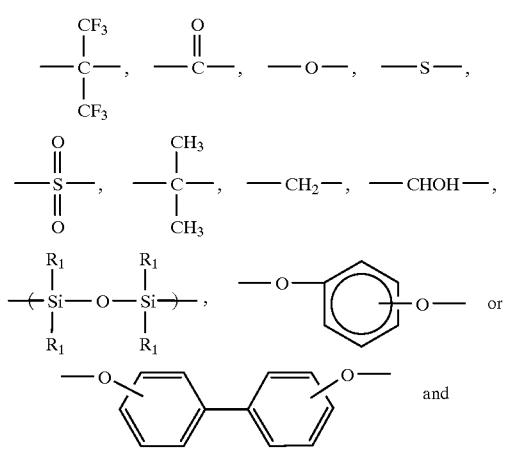

$R_1$ is an aliphatic radical preferably CH$_3$ or C$_2$H$_5$; n equals 1 to 6. In some embodiments Ar$_1$ can be a mixture of these radicals. Ar$_2$ is an aromatic diamine moiety having the following formula:

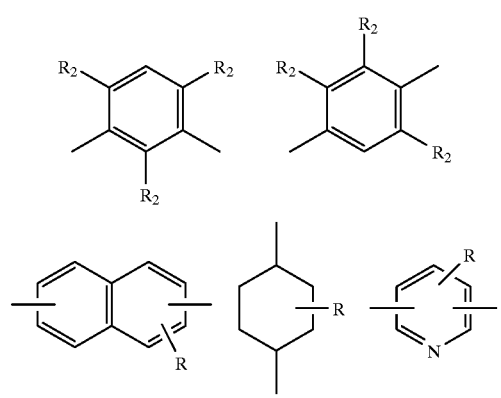

-continued

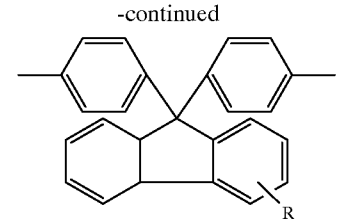

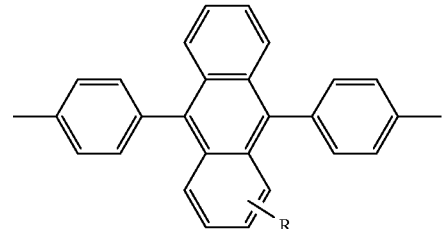

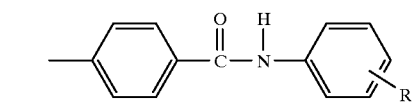

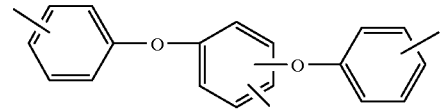

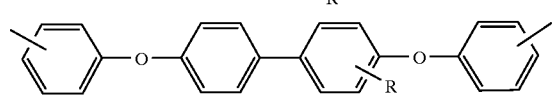

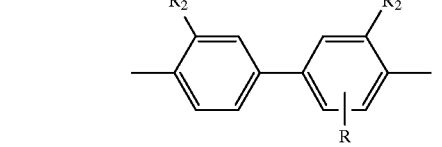

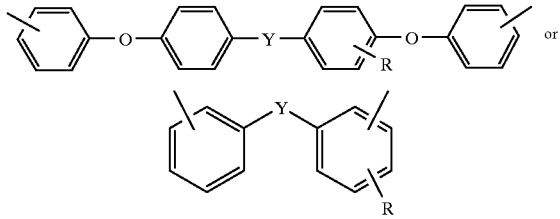

where R is SO$_3$H, SO$_3$M or SO$_2$OR' group and R$_2$ is H, CH$_3$, SO$_3$H, SO$_3$M, SO$_2$OR', CF$_3$, halogen or a mixture thereof, wherein at least one R$_2$ is a sulfonic acid radical. R and M are as specified above. Y is nothing, or

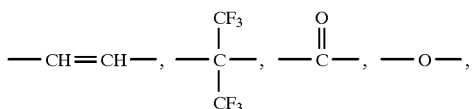

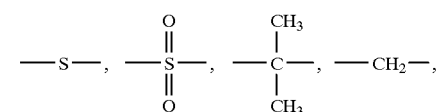

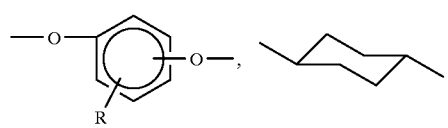

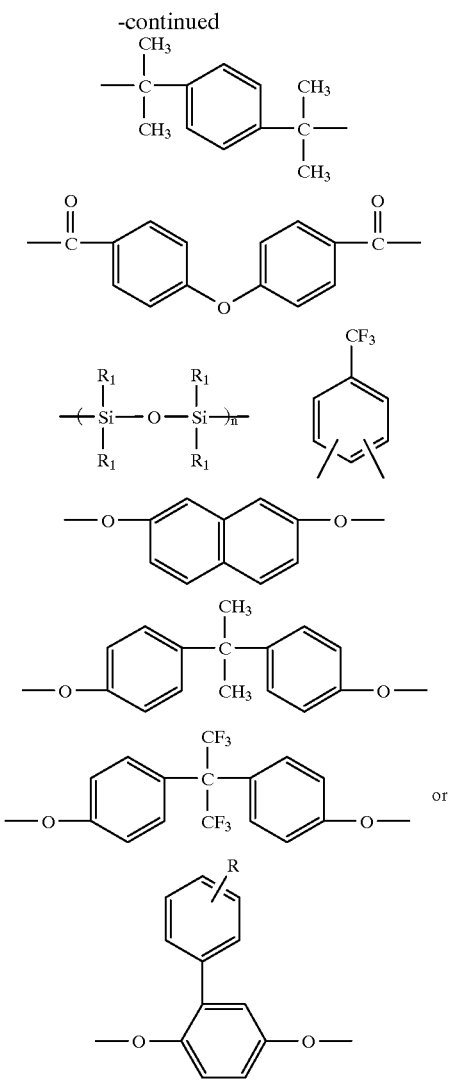

and R, $R_1$ and n are as specified above

The sulfonated polyimides of this invention can be synthesized by several methods. One method involves condensation polymerization of dianhydrides with diamines wherein one of the monomeric units contains sulfonic acid, sulfonic acid salt, or sulfonic ester group. Another method involves direct sulfonation of aromatic polyimide precursors.

The preparation of polyimides is well known in the art. Polyimides are generally prepared in a two-step process in which a dianhydride and a diamine are first reacted to prepare a polyamic acid that is subsequently converted to a polyimide in a second step. A wide variety of dianhydrides and diamines can be reacted to prepare polyimides that are suitable for use in the present invention. The suitable solvents that can be used for the reaction of a dianhydride with a diamine are disclosed in U.S. Pat. No. 3,179,634. Preferably the solvents are dimethylacetamide, dimethylformamide or dimethylsulfoxide. After a polyamic acid is prepared by the reaction of a diamine and a dianhydride, the polyamic acid is converted to a polyimide using thermal or chemical conversion processes. In the case of soluble polyimides, the polyamic acid is preferably chemically converted into a polyimide employing acetic anhydride in the presence of triethylamine as a catalyst. The resulting polyimide can be precipitated by a suitable solvent, recovered and dried. The sulfonated polyimides of this invention can be prepared following the above described methods from dianhydride and diamine monomers that contain sulfonic acid, sulfonic acid salt or sulfonic acid ester groups. The use of diamine monomers with sulfonic acid radicals is particularly preferred. In one preferred embodiment, 2,2'-bis(3,4-dicarboxyphenyl) hexafluoropropane dianhydride (6FDA) is reacted with an aromatic diamine substituted with sulfonic acid groups such as lithium salt of 4,4'-diaminostilbene-2,2'-disulfonic acid. Copolyimides containing sulfonic acid groups can be further prepared from a mixture of two or more diamines containing sulfonic acid radicals. In one example 2,2'-bis(3,4-dicarboxyphenyl) hexafluoropropane dianhydride (6FDA) is reacted with a mixture of aromatic diamines comprised of lithium salts of 4,4'-diaminostilbene-2,2'-disulfonic acid and 4,4'-diamino-2,2'-biphenyldisulfonic acid. Sulfonated copolyimides can be further prepared by condensation polymerization of rigid aromatic dianhydrides and a mixture of sulfonated and unsulfonated diamines. The solubility characteristics and the gas permeation/separation characteristics of the sulfonated polyimides of this invention can be controlled by selecting the appropriate monomers and their combination.

Polyimides of this invention can be further prepared by direct sulfonation of certain aromatic polyimide precursors utilizing sulfonation agents such as chlorosulfonic acid, sulfur trioxide and sulfur trioxide complexes. In general, the sulfonation can be carried out by simple admixture of a solution or suspension of the polyimide with a sulfonation agent in an inert solvent system. The sulfonation procedures applicable for the preparation of sulfonated polyimides of this invention can be found in "Sulfonation and Related Reactions", by E. E. Gilbert, R. E. Krieger Publishing Co. Huntington, N.Y. (1977) and "Mechanistic Aspects of Aromatic Sulfonation and Desulfonation", by H. Cerfontain, Interscience Publishers, NY (1968). It is well known in the art that aromatic rings can be substantially deactivated towards direct sulfonation in the presence of electron withdrawing groups. Thus not all aromatic rings in the polyimide precursor structure are equally susceptible to sulfonation. The aromatic rings in the diamine monomeric unit are typically more susceptible to direct sulfonation. It will be obvious to those skilled in the art to select polyimide precursors with backbone structure that contain reactive aromatic rings to prepare sulfonated polymers of this invention by direct sulfonation, such as the sulfonation of the polyimide prepared from 2,2'-bis(3,4-dicarboxyphenyl) hexafluoropropane dianhydride (6FDA) and 2,4,6-trimethyl-phenylenediamine or polyetherimide commercially available from G.E. Plastics under the trade name ULTEM®.

The preferred sulfonation method for preparation of the sulfonated polyimides of this invention involves reaction with chlorosulfonic acid, sulfur trioxide or with a sulfur trioxide/triethylphosphate complex, wherein the reaction is carried out at low temperatures to limit polymer degradation.

In a typical sulfonation procedure, the polyimide polymer is dissolved in an inert solvent such a methylene chloride or chloroform, the reaction mixture is cooled to below 10° C., preferably below 5° C., and the sulfonation agent is added slowly under vigorous stirring. The polyimide polymers can be effected by exposure to strong acids and bases wherein a severe degradation and a reduction in molecular weight may take place. It has been discovered that the degradation of polyimides during the sulfonation process can be limited if the reaction is carried out under strict anhydrous conditions and the sulfonated polyimide product is converted in situ into a salt form without isolation of the sulfonic acid form intermediate. The conversion to salt form is carried out at the end of the sulfonation process, preferably at reduced temperature conditions, most preferably below 5° C. The neutralization is conducted by introducing an appropriate base such as an organic base, a metal hydroxide or a mixture of a metal hydroxide with a salt under vigorous stirring. The addition is terminated after the pH of about 7 is reached. It was found surprisingly that under this neutralization condition the extent of polymer degradation is most limited. The thus prepared salified sulfonated polyimide can be purified and used for preparation of gas separation membranes. The salified sulfonated polyimide can be also further converted to other desirable counter-ion forms by ion exchange prior to membrane preparation or in the final membrane article.

The solubility characteristics of sulfonated polyimides depend on the degree of substitution and the nature of the counter ion. The concentration of sulfonic acid groups as measured by ion exchange capacity, IEC, can vary from as low as 0.1 meq/g to above 3 meq/g. The preferred range is from 0.5 to 3 meq/g of dry resin in $H^+$ form. The preferred counter ions are alkaline metals and organic monofunctional amines. The most preferred counter ion is lithium. The presence of sulfonic acid groups in high concentrations renders polyimides of this invention soluble in solvent systems such as ketones, oxyalcohols, and aliphatic alcohols and their mixtures with water.

The gas permeability coefficients of polyimides frequently increase with the use of structurally rigid dianydrides and ring substituted diamines. The presence of rigid links and rotation hindering groups can increase gas permeability coefficients and gas separation factors. Introduction of sulfonic acid radicals into the polyimide structure provides such bulky rotation hindering side groups. These groups also render the polymers more soluble. High concentrations of sulfonic acid groups in the polyimide backbone can decrease the gas permeability coefficient but lead to an increase in gas separation factor.

The gas permeability coefficients and gas separation factors of polyimides prepared according to the teachings of this invention were determined using flat-sheet films. The films were prepared by solution casting of polymers dissolved in methanol or dimethylformamide on a glass plate followed by air drying. The air-dried films were stripped from the glass plate and dried in a vacuum oven at 70° C. for one week. The dried films that were 1 to 3 mils thick were sandwiched between two aluminum foils exposing a 2.54 cm diameter area, placed in a permeation cell and sealed with epoxy resin. The downstream side of the cell was evacuated up to about $2 \times 10^{-2}$ mm Hg and the permeate feed gas was introduced from the upstream side. The pressure of the permeate gas on the downstream side was measured using an MKS-Barathon pressure transducer. The permeability coefficient P was calculated from the steady-state gas permeation rate according to the equation:

$$P = C \times V \times L \times dp/dt \times 1/h$$

C=constant
V=volume of collection receiver
L=thickness of film
h=upstream pressure
dp/dt=slope of steady-state line The permeability coefficient P is reported in Barrer units (1 Barrer=$10^{-10} \times cm^3/cm^2$ cmHg sec). To determine the intrinsic viscosity, the reduced and inherent viscosities were measured at three different concentrations (0.40, 0.27 and 0.20 g/dl). The measurements were carried out in Ubbelohde-type viscometers at 25° C. The intrinsic viscosity of the sulfonated samples was measured in 0.5 N lithium perchlorate dimethylformamide solvent mixture.

EXAMPLE 1

The preparation of a polyimide from 2,2'-bis(3,4-dicarboxyphenyl) hexafluoropropane dianhydride (6FDA) and 4,4'-diaminostilbene-2,2'-disulfonic acid lithium salt: 12.9 gms (0.0338 moles) of 4,4'-diaminostilbene-2,2'-disulfonic acid lithium salt were dissolved in 87 ml of dimethylsulfoxide (dried over and distilled from sodium hydroxide pellets under reduced pressure and stored over 4 A molecular sieves prior to use) at room temperature under dry argon atmosphere. The solution was cooled to 20° C. and 15.3 gms (0.0338 moles) of 6FDA were added in 3 gms portions over a period of about half an hour. During the addition the reaction mixture was stirred and the temperature was kept around 20° C. After the addition of 6FDA was completed, a very viscous solution was obtained. 200 ml of DMSO were added to reduce the viscosity. The solution was cooled to 20C and 30 ml of freshly distilled acetic anhydride were added dropwise followed by the addition of 4.9 ml of freshly distilled triethylamine. The solution was stirred for 28 hours at room temperature and 100 ml of acetone were added with vigorous stirring to precipitate the product. The precipitated polymer was filtered and washed with acetone. The polymer was first dried at room temperature followed by drying at 170° C. in a vacuum oven to constant weight. The intrinsic viscosity of thus prepared polyimide was 1.10 dl/g.

EXAMPLE 2

The preparation of a polyamide from 2,2'-bis(3,4-dicarboxyphenyl) hexafluoropropane dianhydride (6FDA) and 4,4'-diamino-2,2'-biphenyldisulfonic acid lithium salt: In accordance with the procedure outlined in Example 1, a polyimide was prepared using the following materials: 12.0 gm (0.0338 mole) 4,4'-diamino-2,2'-biphenyldisulfonic acid lithium salt; 15.3 gm (0.0338 mole) 6FDA; 87 ml dimethylsulfoxide (processed as explained in Example 1). Intrinsic viscosity of this polyimide was 0.63 dl/g.

EXAMPLE 3

Preparation of a copolyimide from 2,2'-bis(3,4-dicarboxyphenyl) hexafluoropropane dianhydride (6FDA) and a mixture of 4,4'-diaminostilbene-2,2'-disulfonic acid lithium salt and 2,4,6-trimethylphenylene-diamine (50/50 ratio). 6.46 gms (0.0169 moles) of 4,4'-diaminostilbene-2,2'-disulfonic acid lithium salt and 2.54 gms (0.0169 moles) of 2,4,6-trimethyl-phenylenediamine were dissolved in 180 ml of dimethylsulfoxide (dried over and distilled from sodium hydroxide pellets under reduced pressure and stored over 4 A molecular sieves) at room temperature under dry argon atmosphere. The solution was cooled to 20° C. and 15.3 gms (0.0338 moles) of 6FDA were added in 3 gms portions over a period of about half and hour. During addition the reaction mixture was agitated and the temperature was kept around 20° C. After the addition was completed, the solution was stirred for two days at room temperature. 30 ml of freshly distilled acetic anhydride were added dropwise to the reaction mixture followed by the addition of 4.9 ml of freshly distilled triethylamine. The solution was stirred for 28 hours at room temperature and the polymer was precipitated into toluene/methylethylketone (5/1) mixture. The polymer was recovered and redissolved in methanol. The final product was recovered by rotary evaporation. Intrinsic viscosity of this copolyimide was 0.36 dl/g.

EXAMPLE 4

The preparation of a copolyimide from 2,2'-bis(3,4-dicarboxyphenyl) hexafluoropropane dianhydride (6FDA) and a mixture of 4,4'-diaminostilbene-2,2'-disulfonic acid lithium salt and 2.6-diaminotoluene (50/50 ratio). In accordance with the procedure outlined in Example 3, a copolyimide was prepared using the following materials: 6.46 gms (0.0169 moles) of 4,4'-diamintostilbene-2,2'-disulfonic acid lithium salt; 2.06 gms (0.0169 moles) of 2,6-diaminotoluene; 15.3 gms (0.0338 moles) of 6FDA; 160 ml dimethylsulfoxide (processed as explained in Example 1). Intrinsic viscosity of this polyimide was 0.48 dl/g.

The solution was rotary evaporated to dryness and the residue was dissolved in 100 ml of methanol. This solution was diluted with 300 ml of water and filtered. The product was dialyzed in dialysis bags of 6000–8000 MWCO (molecular weight cutoff). The aqueous dialyzate was rotary evaporated at 50° C. and the recovered polymer was vacuum dried at 45–50° C. to a constant weight. Intrinsic viscosity of this polymer was 0.77 dl/g. Ion exchange capacity was 1.40 meq/gm of dry polymer in $H^+$ form.

The gas permeability coefficients and gas separation factors of the sulfonated polyimides of the invention, as prepared in accordance with the examples above, are provided in Table 1 below.

TABLE 1

| Polymer Example No. | IV[1] dl/g | IEC[2] | Permeability Coefficient[3] | | | | | Separation Factor | | |
|---|---|---|---|---|---|---|---|---|---|---|
| | | | P He | P $O_2$ | P $N_2$ | P$CH_4$ | P $CO_2$ | $O_2/N_2$ | $He/N_2$ | $CO_2/CH_4$ |
| 1 | 1.1 | 2.53 | 4.16 | 0.06 | 0.01 | — | — | 11 | 830 | — |
| 2 | 0.63 | 2.62 | 6.07 | 0.11 | 0.01 | — | — | 8.4 | 480 | — |
| 3 | 0.36 | 1.48 | 42.8 | 2.66 | 0.41 | 0.16 | 11.4 | 6.4 | 103 | 70 |
| 4 | 0.48 | 1.51 | 25.6 | 1.04 | 0.15 | 0.05 | 4.63 | 7.1 | 176 | 96 |
| 5 | 0.38 | 1.54 | 56.1 | 4.20 | 0.75 | 0.28 | 18.8 | 5.6 | 75 | 66 |
| 6 | 0.77 | 1.3 | 95.4 | 11.6 | 2.36 | 1.18 | 56.2 | 4.9 | 40 | 47 |

[1]Intrinsic viscosity, measured in 0.05 N $LiCLO_4$ in DMF solution at 25 C.
[2]IEC, ion exchange capacity, meq/gram of dry polymer in $H^+$ form.
[3]In Barrer units, measured at 30 C.

EXAMPLE 5

The preparation of a copolyimide from 2,2'-bis(3,4-dicarboxyphenyl) hexafluoropropane dianhydride (6FDA) and a mixture of 4,4'-diamino-2,2'-biphenyldisulfonic acid lithium salt and 2,4,6-trimethylphenylenediamine (50/50 ratio). In accordance with the procedure outlined in Example 3, a copolyimide was prepared using the following materials: 6.02 gms (0.0169 moles) of 4,4'-diamino-2,2'-biphenyldisulfonic acid lithium salt; 2.54 gms (0.0169 moles) of 2,4,6-trimethylphenylenediamine; 15.3 gms (0.0338 moles) of 6FDA; 95 ml dimethyl-sulfoxide (processed as explained in Example 1). Intrinsic viscosity of this copolyimide was 0.38 dl/g.

EXAMPLE 6

Sulfonation of polyimide prepared from 2,2'-bis(3,4-dicarboxyphenyl) hexafluoropropane dianhydride (6FDA) and 2,4,6-trimethylphenylenediamine (VI): The solution of 4 gms (0.072 moles) of polyimide (VI) in 160 ml of methylene chloride and a solution of 1.23 ml (0.029 moles) of sulfur trioxide in 60 ml of methylene chloride were added simultaneously with vigorous stirring to 50 ml of methylene chloride cooled to 0° C. The temperature of the solution was maintained at 0° C. throughout the addition. After the addition was completed, the reaction mixture was stirred for 3 hours at 25° C.

The reaction mixture was cooled again to 0° C. and a solution of 1.23 gms lithium hydroxide monohydrate and 2.45 gms of lithium chloride in 200 ml of methanol were added dropwise to the reaction mixture. The pH of the reaction mixture was adjusted to 7 by adding lithium hydroxide monohydrate solution in methanol as required. The solution was stirred for two days at room temperature.

The sulfonated polyimides of the invention, in addition to exhibiting desirable gas separation characteristics, are found to have good film-forming properties and highly desirable solubility characteristics. As a result, they are highly advantageous for use in the preparation of gas separation membranes.

What is claimed:

1. A gas separation membrane formed from an aromatic polyimide of the following general formula:

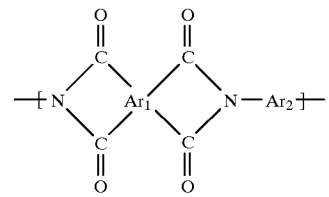

wherein $Ar_1$ and $Ar_2$ are organic radicals with at least 80% of the $Ar_1$ and $Ar_2$ radicals comprising aromatic radicals, and wherein a portion of said $Ar_2$ radicals is a sulfonic acid radical selected from the group consisting of 4,4'-diaministilbene-2,2'-disulfonic acid, 4,4'-diamino-2,2'-biphenyldisulfonic acid, one of their respective salts, or mixtures thereof.

2. The gas separation membrane of claim 1 wherein the concentration of said sulfonic acid radical is from 0.15 to 3 meq/q of dry polymer in $H^+$ form.

3. The gas separation membrane of claim 2 wherein said sulfonic acid radical is the salt of 4,4'-diaministilbene-2,2'-disulfonic acid or the salt of 4,4'-diamino-2,2'-biphenyldisulfonic acid, and wherein said salt contains an alkali cation or an organic base.

4. The gas separation membrane of claim 3, wherein said alkali cation is lithium.

5. The gas separation membrane of claim 1 wherein said aromatic polyimide is a product of 2,2'-bis(3,4-dicarboxyphenyl)hexafluoropropane dianhydride (6FDA) and at least one aromatic diamine that contains said $Ar_2$ radicals.

6. A gas separation membrane formed from an aromatic polyimide of the following general formula:

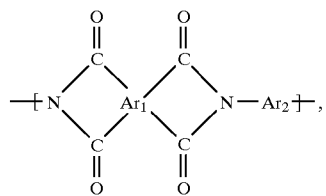

wherein $Ar_1$ and $Ar_2$ are organic radicals with at least 80% of the $Ar_1$ and $Ar_2$ radicals comprising aromatic radicals, and wherein a portion of each of said $Ar_1$ and $Ar_2$ aromatic radicals contain sulfonic acid radicals.

* * * * *